(12) United States Patent
Kapustin et al.

(10) Patent No.: US 7,354,348 B2
(45) Date of Patent: Apr. 8, 2008

(54) HOLLOW UNIVERSAL JOINT

(75) Inventors: Eugene Kapustin, Thornhill (CA); Sergei Filippovitch, Richmond Hill (CA)

(73) Assignee: PII (Canada) Limited, Markham, Ontario (CA)

( * ) Notice: Subject to any disclaimer, the term of this patent is extended or adjusted under 35 U.S.C. 154(b) by 172 days.

(21) Appl. No.: 11/280,214

(22) Filed: Nov. 17, 2005

(65) Prior Publication Data

US 2006/0128479 A1 Jun. 15, 2006

(30) Foreign Application Priority Data

Dec. 13, 2004 (CA) .................................. 2490102

(51) Int. Cl.
*F16D 3/42* (2006.01)
(52) U.S. Cl. ...................................... 464/119; 464/125
(58) Field of Classification Search ............ 285/150.1, 285/153.1, 153.2; 464/119, 125, 126; 324/220, 324/221; 174/86; 15/104.061

See application file for complete search history.

(56) References Cited

U.S. PATENT DOCUMENTS

| | | | | |
|---|---|---|---|---|
| 238,454 A | * | 3/1881 | State ....................... | 464/125 X |
| 1,451,946 A | * | 4/1923 | Funnell ................... | 464/125 X |
| 1,491,565 A | * | 4/1924 | Sundstrand ............. | 464/125 X |
| 3,949,292 A | | 4/1976 | Beaver et al. ............. | 324/220 |
| 4,072,894 A | | 2/1978 | Barton ...................... | 324/221 |
| 4,434,427 A | | 2/1984 | Clarke et al. | |
| 4,964,840 A | * | 10/1990 | Kapaan ...................... | 464/125 |
| 5,048,622 A | | 9/1991 | Ide .............................. | 175/107 |
| 5,532,587 A | | 7/1996 | Downs et al. .............. | 324/220 |
| 5,816,926 A | | 10/1998 | Lynch et al. ................ | 464/114 |
| 6,773,353 B2 | * | 8/2004 | Cornay et al. .......... | 464/126 X |

* cited by examiner

*Primary Examiner*—Greg Binda
(74) *Attorney, Agent, or Firm*—GE Global Patent Operation; Mardson Q. McQuay (57) ABSTRACT

A hollow universal joint having a first member, a second member and a first hollow yoke ring coupling the first member to the second member to transfer rotational motion between the first and second members. The first hollow yoke ring has a first central axis. The first hollow yoke ring has first pivot points pivotally coupled with the first member. The first pivot points define a first axis extending therebetween. The first pivot points are spaced from the first central axis. The first hollow yoke ring comprises second pivot points pivotally coupled with the second member. The second pivot points define a second axis extending therebetween. The second pivot points are spaced from the first central axis. The first axis extends orthogonal to the second axis and the first and second axes each extend orthogonal to the first central axis.

28 Claims, 4 Drawing Sheets

HOLLOW UNIVERSAL JOINT

BACKGROUND OF THE INVENTION

The present invention relates to a hollow universal joint and in particular to a double hollow universal joint adapted to protectively house cabling extending through the joint and/or utilizing a stiffening material limiting buckling of the joint.

Universal joints have been used to interconnect working sections of a pig train used to inspect pipelines. In particular, the universal joints may be used in a pig train to interconnect the tow section to a magnetizing section, between magnetizing sections and to connect the magnetizing section with downstream recording and control devices. The universal joints used in this application typically comprise two coupled shafts that extend along the axis of the pipeline when the pig is moving along a straight path in the pipeline.

The universal joint is useful in allowing sections of the pig train to negotiate around bends in the pipe. However, this type of universal joint does not protect any cabling that extends between sections of the pig train. This cabling may wear when rubbing against the inside walls of the pipeline particularly when the pig train is negotiating a sharp bend in the pipe line. Also, the joint, particularly when configured as a double universal joint, has a tendency to buckle causing potential collision of adjacent sections of the pig train. While the joint is designed to negotiate bends in the pipeline any buckling of the joint in straight sections of a pipeline introduces error into the magnetically sensed readings of two magnetizer sections coupled by the joint.

Accordingly, there is a need to for a universal joint that is either able to protect cabling extending between sections coupled by the joint and/or is able to reduce axial freeplay between pig sections coupled by the universal joint.

BRIEF DESCRIPTION OF THE INVENTION

The present invention relates to a hollow universal joint comprising a hollow yolk ring pivotally coupled to two members for transferring rotational movement between the members.

In one embodiment the hollow universal joint comprises a first member, a second member, and a first hollow yoke ring coupling the first member to the second member to transfer rotational motion between the first and second members. The first hollow yoke ring has a first central axis. The first hollow yoke ring comprises a first pair of first pivot points pivotally coupled with the first member. The first pivot points define a first axis extending therebetween and the first pivot points are spaced from the first central axis. The first hollow yoke ring comprises a second pair of second pivot points pivotally coupled with the second member. The second pivot points define a second axis extending therebetween and the second pivot points are spaced from the first central axis. The first axis extends orthogonal to the second axis. The first and second axes each extend orthogonal to the first central axis.

The hollow yolk ring has an internal passageway throughwhich cabling and/or stiffening materials may extend.

In another embodiment the first and second axis each intersect the first central axis at right angles. In another embodiment the first axis is offset along the first central axis from the second axis.

In an embodiment the first hollow yoke ring comprises a first pair of opposing first arches having first apexes that define the first pivot points, and the first hollow yoke ring comprises a second pair of opposing second arches having second apexes that define the second pivot points.

In an embodiment, the first apexes define second common feet for the second arches and the second apexes define first common feet for the first arches.

In an embodiment, the first pair of opposing first arches diverge from each other along the first central axis from the first common feet to the first apexes and the second pair of opposing second arches diverge from each other along the first central axis from the second common feet to the second apexes.

In one embodiment, the first member and the second member each comprise a ring member. The ring member may be pivotally attached to a corresponding device portion of a pig train and cabling may extend between the device portions through the first member, the first hollow yolk ring and the second member.

In one embodiment, the first hollow yolk ring surrounds the first member and the second member. Alternatively the first and/or second member may surround the yolk ring.

In one embodiment, the second member is hollow and the hollow universal joint further comprises a third member and a second hollow yoke ring coupling the second member to the third member to transfer rotational motion between the second and third members. The second hollow yoke ring has a second central axis and comprises a third pair of third pivot points pivotally coupled with the second member. The third pivot points defines a third axis extending therebetween and are spaced from the second central axis. The third hollow yoke ring comprises a fourth pair of fourth pivot points pivotally coupled with the third member. The fourth pivot points define a fourth axis extending therebetween and are spaced from the second central axis. The third axis extends orthogonal to the fourth axis and the third and fourth axes each extending orthogonal to the second central axis.

In one embodiment, the first and third members have hollow portions respectively adjacent the first and second yoke rings and the universal joint further comprises a stiffening member extending from the hollow portion of the first member to the hollow portion of the third member through the first hollow yolk ring, the second member and the third yolk ring. The stiffening member is snugly fit into the hollow portion of the first member, the hollow portion of the third member and the second member. This stiffening member acts to limit bending of the joint about a central axis running through the joint. This is particularly advantageous when such a joint is used between two magnetizing sections of a pig train because the stiffening member maintains the straight when the pig is travelling along straight lengths of pipeline. In an alternative embodiment, it is envisaged that the stiffening member surrounds at least the first and second hollow yolk rings and the second member to limit axial bending freeplay of the joint.

In another embodiment, the stiffening member has a central bore extending axially therealong throughwhich cabling extends from the first member to the third member.

In another embodiment the first member comprises a portion for a first magnetic sensing device of a pig train and the third member comprises a portion of a second magnetic sensing device of the pig train.

BRIEF DESCRIPTION OF THE DRAWINGS

For a better understanding of the nature and objects of the present invention reference may be had by way of example to the accompanying diagrammatic drawings.

DETAILED DESCRIPTION

The present invention relates to a hollow universal joint and in particular to a double hollow universal joint adapted to protectively house cabling extending through the joint and/or utilizing a stiffening material limiting buckling of the joint.

Referring to FIGS. 1 through 4 there is shown a double hollow universal joint 8 having two hollow universal joints 10. The double universal joints 10 interconnect a first member 12, a second member 14 and a third member 24. It should be understood that the double hollow universal joint 8 shown in these Figures has specific application with respect to use in a pig train for pipeline inspection devices. Accordingly, the first member 12 and the third member 24 are shown as blocks having fastening bolts 15 and a hollow central bore 17 that is adapted to be attached to a pig device of a pig train. While the illustrations relate to this application, it should be understood that the first member 12 and the third member 24 may comprise alternative structures. Further, second member 14 is shown in the drawings as a hollow tubular structure. It should be understood that this intermediate structure in the double hollow joint 8 may vary in length and actually be as short as or close to approximating that shape of a ring. Accordingly, the first member 12, the second member 14 and the third member 24 may comprise other shapes such as ring shapes or shaft like members for example. Hence, the double universal joint 8 as shown in FIGS. 1 through 4 may have other applications than that which is described herein, and each of the universal joints 10 may be utilized on its own as a single hollow universal joint for alternative applications.

Referring to FIGS. 1 through 4 the first block 12 is shown connected to the second member or intermediate tubular sleeve 14 by a first hollow yoke ring 16. Likewise, the second member or hollow tubular sleeve 14 is shown connected to the third member 24 by a second hollow yoke ring 26.

The first hollow yoke ring 16 acts to allow for universal joint movement between the first member 12 and the second member 14. The second hollow yoke 26 allows for universal joint motion between the third member 24 and the second member 14. In FIGS. 1 to 4, the double universal joint 8 is shown with all members extending along an axis 9. It should be understood that the joints are capable of angular offsetting the members relative to each other and this axis 9 in a manner common to universal joints. For example, reference is made to FIG. 7.

The first hollow yoke ring 16 transfers rotational motion between the first and second members 12, 14. The first hollow yoke ring 16 surrounds a first central axis 18 and comprises a first pair of first pivot points 20 pivotally coupled with the first member 12. The first pivot points 20 define a first axis 22 (FIG. 2) extending therebetween. The first pivot points 20 are spaced from the first central axis 18. The first axis 22 is orthogonal to the first central axis 18 and in the embodiment shown intersects the first central axis 18 at right angles.

The first hollow yoke ring 16 comprises a second pair of second pivot points 28 (FIG. 3) pivotally coupled with the second member 14. The second pivot points 28 define a second axis 30 extending therebetween. The second pivot points 28 are spaced from the first central axis 18. The first axis 22 extends orthogonal to the second axis 30 and the first and second axes 22, 30 each extend orthogonal to the first central axis 18. The second axis 30 is orthogonal to the first central axis 18 and in the embodiment shown intersects the first central axis 18 at right angles. It should be understood that the relative orientation of the axes 18, 22, and 30 remains constant despite the angular offset of the central axis 18 relative to axis 9.

In the embodiment shown, the first hollow yoke ring 16 comprises a first pair of opposing first arches 32 having first apexes 34 that define the first pivot points 20. Also the first hollow yoke ring 16 comprises a second pair of opposing second arches 36 having second apexes 38 that define the second pivot points 28. In this embodiment the first axis 22 is offset along the first central axis 18 from the second axis 30. The first apexes 34 define second common feet or footings 34a for the second arches 36 and the second apexes 38 define first common feet or footings 38a for the first arches 32. The first pair of opposing first arches 32 diverge from each other along the first central axis 18 from the first common feet 38a to the first apexes 34. The second pair of opposing second arches 36 diverge from each other along the first central axis 18 from the second common feet 34a to the second apexes 38. The angle of divergence of the arches 32, 36 is chosen to define the angle of pivoting of the yolk ring 16 about it pivot points 20, 28, respectively.

Similarly, the second hollow yoke ring 26 transfers rotational motion between the second and third members 14, 24. The second hollow yoke ring 26 surrounds a second central axis 40 which is shown in the drawings as an extension of the first central axis 18 and axis 9. However, it should be understood that the second central axis 40 is only that axis portion that extends through the second hollow yoke ring 26 irregardless of the angle of orientation of the second hollow yoke ring 26 relative to the first hollow yoke ring 16. Similarly, the first central axis 18 is that axis portion that extends through the first hollow yoke ring 16.

The second hollow yoke ring 26 comprises a third pair of third pivot points 42 pivotally coupled with the second member 14. The third pivot points 42 define a third axis 44 (FIG. 2) extending therebetween. The third pivot points 42 are spaced from the second central axis 40. The third axis 44 is orthogonal to the second central axis 40 and in the embodiment shown intersects the second central axis 40 at right angles. It should be understood that the relative orientation of the axes 40, 44 and 48 remains constant despite the angular offset of the second central axis 40 relative to axis 9.

The second hollow yoke ring 26 comprises a fourth pair of fourth pivot points 46 pivotally coupled with the third member 24. The fourth pivot points 46 define a fourth axis 48 (FIG. 3) extending therebetween. The fourth pivot points 46 are spaced from the second central axis 40. The third axis 44 extends orthogonal to the fourth axis 48. The fourth axis 48 is orthogonal to the second central axis 40 and in the embodiment shown intersects the second central axis 40 at right angles.

In the embodiment shown, the second hollow yoke ring 26 comprises a third pair of opposing third arches 50 having third apexes 52 that define the third pivot points 42. Also the second hollow yoke ring 26 comprises a fourth pair of opposing fourth arches 54 having fourth apexes 56 that define the fourth pivot points 46. In this embodiment the third axis 44 is offset along the second central axis 40 from the fourth axis 48. The third apexes 52 define fourth common feet or footings 52a for the fourth arches 54 and the fourth apexes 56 define third common feet or footings 56a for the third arches 50. The third pair of opposing third arches 50 diverge from each other along the second central axis 40 from the third common feet 56a to the third apexes 52. The fourth pair of opposing fourth arches 54 diverge from each other along the second central axis 40 from the fourth common feet 52a to the fourth apexes 56. The angle of divergence of the arches 50, 54 is chosen to define the angle of pivoting of the yolk ring 16 about it pivot points 46, 48, respectively.

The use of the arches and the diverging nature of the arches of each pair of arches relative to each other allows for a range of pivoting motion that would otherwise be more limited. In the embodiment shown each of the yoke rings 16, 26 can rotate or pivot up to 70 degrees relative to the axis 9 illustrated in the drawings that runs through the double universal joint 8. Further, the tubular second member 14 has a first end portion 60 coupled to the first yoke ring 16. The first end portion 60 has oppositely facing first recessed arches 62 that open towards the second arches 36 of the first yoke ring 16. The second tubular member 14 has second end portions 64 that have oppositely facing second recessed arches 66 opening towards the third arches 44 of the second yoke ring 26. These recessed arches 62 and 66 further enhance the range of pivotal motion between member 14 coupled to the yoke rings 16 and 26.

In FIGS. 1 to 4, the first yoke ring 16 and the second yoke ring 26 each respectively surround the members 12, 14, and 14, 24 to which these yoke rings are attached. It should be understood that in an alternative embodiments it is possible that the diameter of the yoke rings 16 and 26 may be less than that of either the second member 14 and/or the first and third members 12 and 24.

In the embodiment shown in FIGS. 1 through 4 it can be seen that the first axis 22 is parallel to the third axis 44. Also the second axis 30 is parallel to the fourth axis 48. The orientation of these axes in this manner permits for a uniform symmetrical construction of the double universal joint 8 about the second member 14 and allows for better prediction of the joint to negotiate bends in a pipeline. However, this orientation between corresponding axes of the two yoke rings 16, 26 may not be used in alternative embodiments.

The pivotal coupling of each of the yoke rings 16, 26 is accomplished by pins 75 that extend through-aligned openings in each of the first member 12 and second member 14, and second member 14 and third member 24. Pins 75 are shown to have heads and utilize a washer on the opposite side through which a cotter pin extends through an opening in the pin 75. This permits for the simple interconnection of the parts of the universal joints 10.

Figure 1:
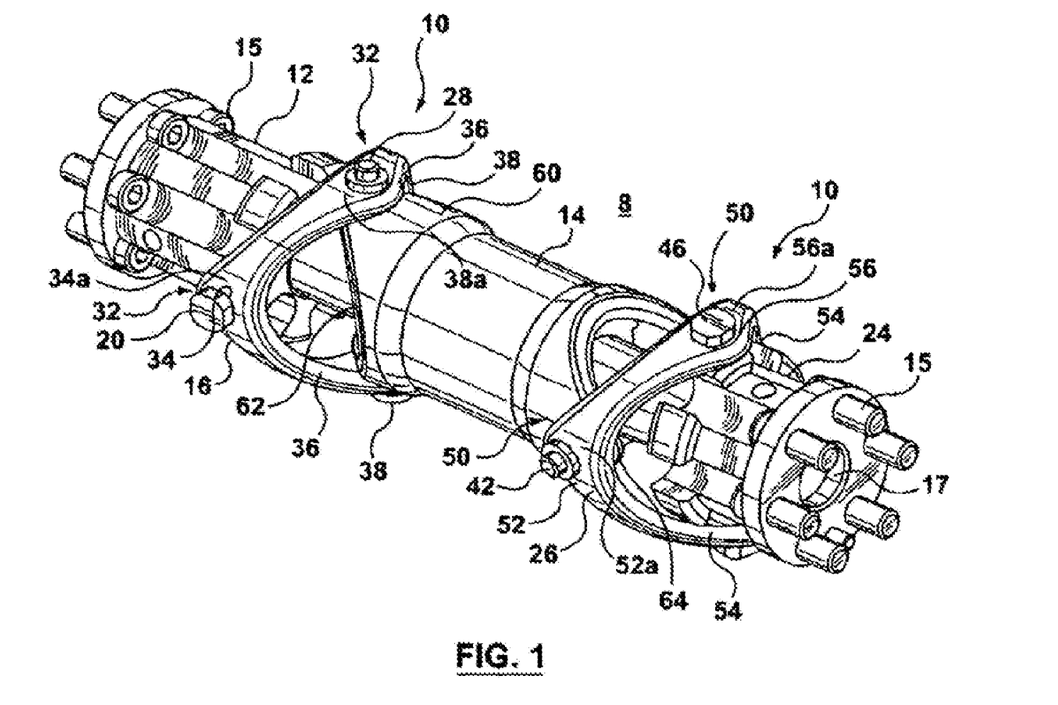
FIG. 1 is a perspective view of one embodiment of the hollow universal joint.
Figure 2:
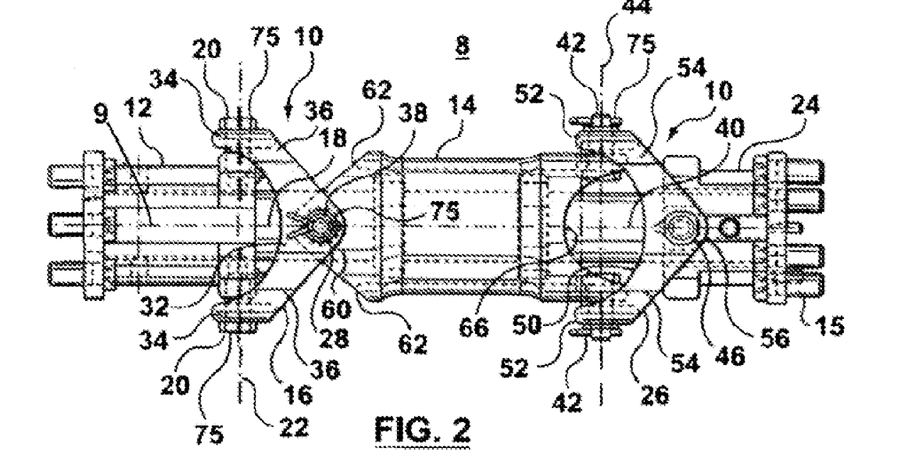
FIG. 2 is a plan view of FIG. 1.
Figure 3:
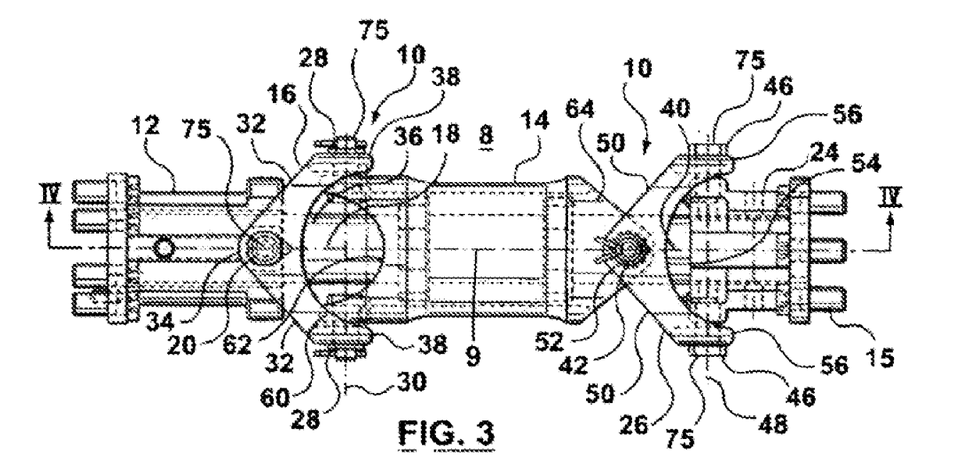
FIG. 3 is a side view of FIG. 1.
Figure 4:
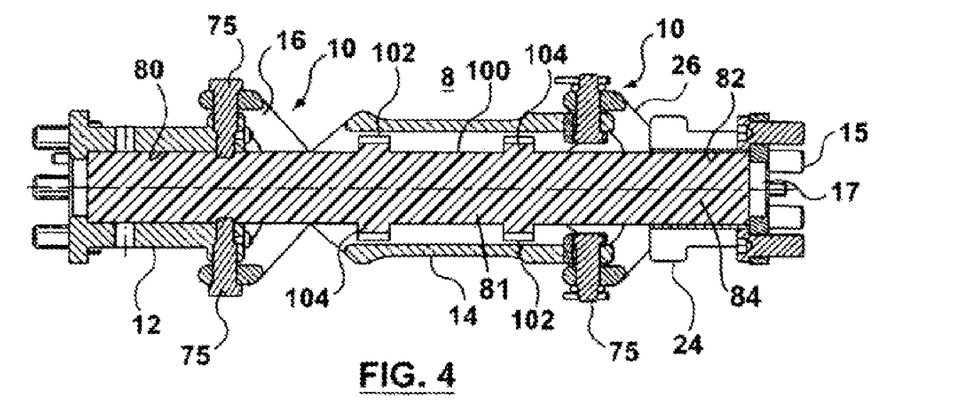
FIG. 4 is a sectional view taken along lines IV-IV of FIG. 3.

As best seen in FIG. 4, the first and third members 12, 24 have hollow portions 80, 82 that are located adjacent the first and second yoke rings 16 and 26. The universal joint in FIG. 4 further comprises a stiffening member 84. The stiffening member 84 typically comprises a polyurethane plastic material whose density determines the stiffness of the material. The stiffening member 84 extends from the hollow portion 80 of the first men her 12 to the hollow portion 81 of the second member 14 through the first yoke ring 16, the second member 14 and the third yoke ring 26. The stiffening member 84, is snugly fit into the hollow portion 80 of the first member 12, the hollow portion 82 of the third member 24 and the second member 14. The inside wall 100 of the second member 14 has a plurality of radially spaced apart and axially extending recessed grooves 102 and the stiffening member 84 further includes corresponding axially extending flanges 104 that snugly fit into the recessed grooves 102. It is further noted that two of the pins 75 also extend into the stiffening member 84 r bite into this member 84. The purpose of the stiffening member 84 is to prevent the collapse of the double universal joint 8 when the pushing or pulling forces on this joint 8 are not present. Further, stiffening member 84 also reduces bending or buckling of the double universal joint 8 between the first member 12 and the third member 24 when the joint 8 is to be maintained aligned such as, for example, when travelling through a straight section of a pipeline.

Figure 5:
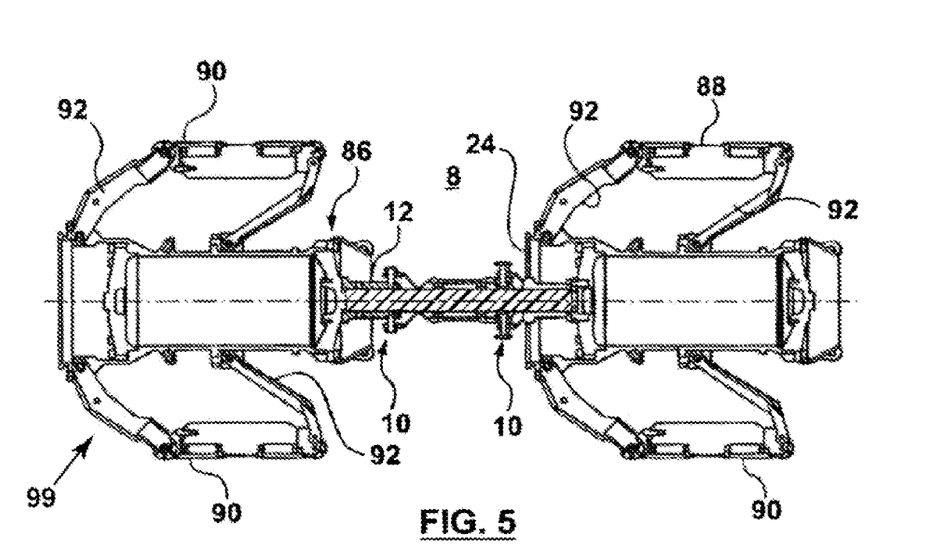
FIG. 5 is a sectional view of two magnetizer sections of a pig train coupled together by the universal joint shown in FIG. 1.
Figure 6:
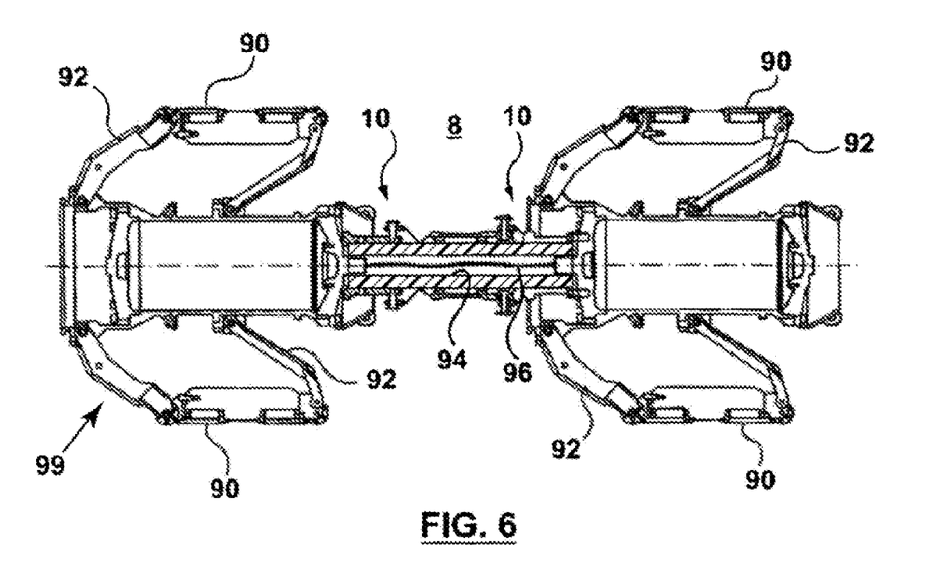
FIG. 6 is a view similar to FIG. 5 showing the addition of cabling running through the center of the universal joint; and, FIG. 7 shows an alternative embodiment for the universal joint coupling two sections of a pig train.

Referring to FIGS. 5 and 6 there is shown an application for the double universal joint 8. In the embodiments shown, the first member 12 is shown connected to a first device 86 of a pig train 99. The third member 24 is shown as a block connected to a second device 88 of a pig train 99. In this pig train, the pig devices typically comprise a pig towing device followed by other pig devices (not shown) that travel through a pipeline and carry either recording devices and/or power for the overall device. Each of the first device 86 and the second device 88 are magnetic sensing devices. These devices comprise a series of magnetic shoes 90 attached in a circumference about the pig devices 86 and 88. The magnetic shoes 90 are supported by collapsible or partially collapsible arms 92. The collapsing of these arms 92 is well known in the art of pipeline inspection and is used for the purpose of allowing the magnetizing devices to travel through portions or sections of pipeline having different diameters. The purpose of the magnetic shoes 90 is to take sample readings of the pipeline to determine the structural integrity of the pipeline. This information is fed to recording devices carried by other sections of the pig train. Two magnetic sections are shown spaced apart axially from each other, however it should be understood that these sections must negotiate through bends of various angles in the pipeline. Accordingly, the double universal joint S assists in having or allowing these magnetizing sections to traverse the pipeline In FIG. 5, the embodiment of the universal joint 8, as shown in FIG. 4 is utilized. In this embodiment it is possible that cabling running between the sections of the pig train may not have to extend through the hollow universal joint In FIG. 6, the stiffening device 84 has a central bore 94 through which cabling 96 is adapted to pass. By having the cabling 96 extending through the hollow center of the double universal joint 8, the cables 96 are protected engaging sidewall surfaces of the pipeline as the pig, device negotiates bends in the pipeline.

Figure 7:
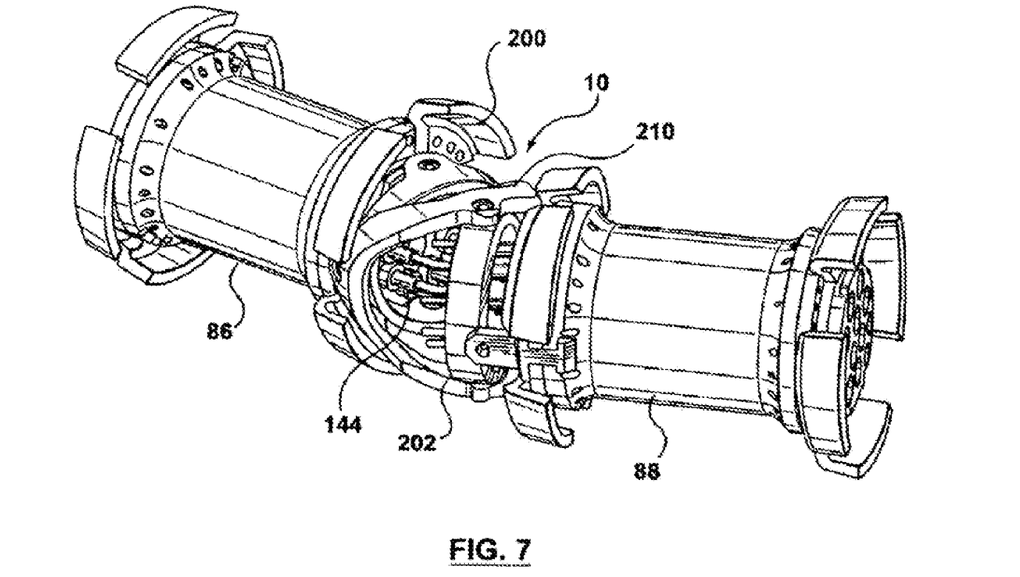

Referring to FIG. 7, there is shown an alternative embodiment for the universal joint 10 of the present invention. In this embodiment, the universal joint 10 interconnects members 86 and 88. In this embodiment, the universal joint 10 comprises a first ring member 200 and a second ring member 202 each pivotally attached to the respective members 86 and 88. The members 86 and 88 may comprise pig devices utilized in a pig train. The rings 200 and 202 are also pivotally connected to a hollow yoke ring 210. The hollow yoke ring 210 is of similar construction as the first and second yoke rings 16, 26 described above. In the embodiment shown, cabling 144 extends between the device portions 86 and 88, through the first ring member 200, the yoke ring 210, and ring member 202. The ring members 200 and 202 together with the yoke ring 210 surround the cabling 144 and provide protection to cabling 144.

While the invention has been described in terms of various specific embodiments, those skilled in the art will recognize that the invention can be practiced with modifications.

What is claimed is:

1. A hollow universal joint comprising:
   a first member,
   a second member, and
   a first hollow yoke ring coupling the first member to the second member to transfer rotational motion between the first and second members, the first hollow yoke ring having a first central axis and the first hollow yoke ring comprising a first pair of first pivot points pivotally coupled with the first member, the first pivot points defining a first axis extending therebetween and the first pivot points being spaced from the first central axis, the first hollow yoke ring comprising a second pair of second pivot points pivotally coupled with the second member, the second pivot points defining a second axis extending therebetween and the second pivot points being spaced from the first central axis, the first axis extending orthogonal to the second axis and the first and second axes each extending orthogonal to the first central axis, the first hollow yoke ring comprising a first pair of opposing first arches having first apexes that define the first pivot points, and the first hollow yoke ring comprises a second pair of opposing second arches having second apexes that define the second pivot points where the first apexes define second common feet for the second arches and the second apexes define first common feet for the first arches, wherein the first axis is offset along the first central axis from the second axis.

2. The hollow universal joint of claim 1 wherein the first and second axis each intersect the first central axis at right angles.

3. The hollow universal joint of claim 1 wherein the first and second axis each intersect the first central axis at right angles.

4. The hollow universal joint of claim 1 wherein the first hollow yolk ring surrounds the first and second members.

5. The hollow universal joint of claim 1 wherein the first member and the second member each comprise a ring member.

6. The hollow universal joint of claim 5 wherein the ring member is pivotally attached to a corresponding device portion of a pig train.

7. The hollow universal joint of claim 6 wherein cabling extends between the device portions through the first member, the first hollow yolk ring and the second member.

8. The hollow universal joint of claim 1 wherein the second member is hollow and the universal joint further comprises a third member and a second hollow yoke ring coupling the second member to the third member to transfer rotational motion between the second and third members, and the second hollow yoke ring having a second central axis and comprising a third pair of third pivot points pivotally coupled with the second member, the third pivot points defining a third axis extending therebetween and the third pivot points being spaced from the second central axis, a third hollow yoke ring comprising a fourth pair of fourth pivot points pivotally coupled with the third member, the fourth pivot points defining a fourth axis extending therebetween and the fourth pivot points being spaced from the second central axis, the third axis extending orthogonal to the fourth axis and the third and fourth axes each extending orthogonal to the second central axis.

9. The hollow universal joint of claim 8 wherein the first and third members have hollow portions respectively adjacent the first and second rings and the universal joint further comprising a stiffening member extending from the hollow portion of the first member to the hollow portion of the third member through the first hollow yolk ring, the second member and the third yolk ring, and the stiffening member being snugly fit into the hollow portion of the first member, the hollow portion of the third member and the second member.

10. The hollow universal joint of claim 9 wherein the stiffening member has a central bore extending axially therealong throughwhich cabling extends from the first member to the third member.

11. The hollow universal joint of claim 9 wherein the first member comprises a portion for a first magnetic sensing device of a pig train and the third member comprises a portion of a second magnetic sensing device of the pig train.

12. The hollow universal joint of claim 9 wherein the first member comprises a first device of a pig train and the third member comprises a second device the pig train.

13. The hollow universal joint of claim 8 further comprising cabling extending from the first member to the third member through the first hollow yolk ring, the second member and the third yolk ring.

14. The hollow universal joint of claim 8 wherein the first hollow yolk ring surrounds the first member and the second member and the second hollow yolk ring surrounds the second member and the third member.

15. The hollow universal joint of claim 8 wherein the universal joint further comprising a stiffening member surrounding at least the first and second hollow yolk rings and the second member.

16. A hollow universal joint comprising:
a first member,
a second member, and
a first hollow yoke ring coupling the first member to the second member to transfer rotational motion between the first and second members, the first hollow yoke ring having a first central axis and the first hollow yoke ring comprising a first pair of first pivot points pivotally coupled with the first member, the first pivot points defining a first axis extending therebetween and the first pivot points being spaced from the first central axis, the first hollow yoke ring comprising a second pair of second pivot points pivotally coupled with the second member, the second pivot points defining a second axis extending therebetween and the second pivot points being spaced from the first central axis, the first axis extending orthogonal to the second axis and the first and second axes each extending orthogonal to the first central axis, the first hollow yoke ring comprising a first pair of opposing first arches having first apexes that define the first pivot points, and the first hollow yoke ring comprises a second pair of opposing second arches having second apexes that define the second pivot points where the first apexes define second common feet for the second arches and the second apexes define first common feet for the first arches, wherein the first pair of opposing first arches diverge from each other along the first central axis from the first common feet to the first apexes and the second pair of opposing second arches diverge from each other along the first central axis from the second common feet to the second apexes.

17. The hollow universal joint of claim 16 wherein the first hollow yolk ring surrounds the first and second members.

18. The hollow universal joint of claim 16 wherein the first member and the second member each comprise a ring member.

19. The hollow universal joint of claim 18 wherein the ring member is pivotally attached to a corresponding device portion of a pig train.

20. The hollow universal joint according to claim 19 wherein cabling extends between the device portions through the first member, the first hollow yolk ring and the second member.

21. A hollow universal joint comprising:
a first member,
a second member, and
a first hollow yoke ring coupling the first member to the second member to transfer rotational motion between the first and second members, the first hollow yoke ring having a first central axis and the first hollow yoke ring comprising a first pair of first points pivotally coupled with the first member, the first pivot points defining a first axis extending therebetween and the first pivot points being spaced from the first central axis, the first hollow yoke ring comprising a second pair of second pivot points pivotally coupled with the second member, the second pivot points defining a second axis extending therebetween and the second pivot points being spaced from the first central axis, the first axis extending orthogonal to the second axis and the first and second axes each extending orthogonal to the first central axis, the first hollow yoke ring comprising a first pair of opposing first arches having first apexes that define the first pivot points, and the first hollow yoke ring comprises a second pair of opposing second arches having second apexes that define the second pivot points where the first apexes define second common feet for the second arches and the second apexes define first common feet for the first arches, wherein the second member is hollow and the universal joint further comprises a third member and a second hollow yoke ring coupling the second member to the third member to transfer rotational motion between the second and third members, and the second hollow yoke rings having a second central axis comprising a third pair of third pivot points pivotally coupled with the second member, the third pivot points defining a third axis extending therebetween and the third pivot points being spaced from the second central axis, a third hollow yoke ring comprising a fourth pair of forth pivot points pivotally coupled with the third member, the fourth pivot points defining a forth axis extending therebetween and the fourth pivot points being spaced from the second central axis, the third axis extending orthogonal to the forth axis and the third and fourth axes each extending orthogonal to the second central axis, and wherein
the first axis is offset along the first central axis from the second axis and the third axis is offset along the second central axis from the fourth axis;
the first and second axes each intersect the first central axis at right angles;
the third and the fourth axes each intersect the second central axis at right angles;
the second hollow yoke ring comprises a third pair of opposing third arches having third apexes that define the third pivot points, and the second hollow yoke ring comprises a fourth pair of opposing fourth arches having fourth apexes that define the fourth pivot points;
the third apexes define fourth common feet for the fourth arches and the forth apexes define third common feet for the third arches;

the first pair of opposing first arches diverge from each other alone the first central axis from the first common feet to the first apexes and the second pair of opposing second arches diverge from each other along the first central axis from the second common feet to the second apexes; and, the third pair of opposing third arches diverge from each other along the second central axis from the third common feet to the third apexes and the fourth pair of opposing fourth arches diverge from each other along the second central axis from the fourth common feet to the fourth apexes.

22. The hollow universal joint according to claim 21 wherein the second member is a tubular member having a first end portion coupled with the first hollow yolk ring and a second end portion coupled with the second hollow yolk ring, the first end portion of the second member having oppositely facing first recessed arches opening to the second arches of the first yoke ring, and the second end portion of the second member having oppositely facing second recessed arches opening to the third arches of the second hollow yolk ring.

23. The hollow universal joint of claim 21 wherein the first member comprises a first device of a pig train and the third member comprises a second device the pig train.

24. The hollow universal joint of claim 21 wherein pivotal coupling of the first apexes to the first member, the second apexes to the second member, the third apexes to the second member and the fourth apexes to the third member comprises pins extending through aligned openings in the first member and the first hollow yolk ring, the first hollow yolk ring and the second member, the second member and the second hollow yolk ring, and the second hollow yolk ring and the third member.

25. The hollow universal joint of claim 21 wherein the first and third member have hollow portions respectively adjacent the first and second yoke rings and the universal joint further comprising a stiffening member extending from the hollow portion of the first member to the hollow portion of the third member through the first hollow yolk ring, the second member, and the third yolk ring, and the stiffening member being snugly fit into the hollow portion of the first member, the hollow portion of the third member, and the second member.

26. The hollow universal joint of claim 25 wherein the stiffening member has a central bore extending axially therealong through which cabling extends from the first member to the third member.

27. The hollow universal joint of claim 25 wherein the second member is tubular and has an inside wall with a plurality of radially spaced apart and axially extending recessed grooves and the stiffening member further including corresponding axially extending flanges that snugly fit into the recessed grooves.

28. The hollow universal joint of claim 25 wherein the first member comprises a portion for a first magnetic sensing device of a pig train and the third member comprises a portion of a second magnetic sensing device of pig train.

* * * * *

UNITED STATES PATENT AND TRADEMARK OFFICE
CERTIFICATE OF CORRECTION

PATENT NO. : 7,354,348 B2
APPLICATION NO. : 11/280214
DATED : April 8, 2008
INVENTOR(S) : Kapustin et al.

It is certified that error appears in the above-identified patent and that said Letters Patent is hereby corrected as shown below:

In Column 5, Line 55, delete "men her" and insert -- member --, therefor.

In Column 5, Line 65, after "84" delete "r" and insert -- or --, therefor.

In Column 6, Line 30, after "joint" delete "S" and insert -- 8 --, therefor.

In Column 6, Line 32, delete "pipeline" and insert -- pipeline. --, therefor.

In Column 6, Line 35, delete "joint" and insert -- joint. --, therefor.

In Column 6, Line 39, delete "pig," and insert -- pig --, therefor.

In Column 7, Line 60, in Claim 9, after "second" insert -- yoke --.

In Column 8, Line 12, in Claim 12, after "device" insert -- of --.

In Column 9, Line 35, in Claim 21, delete "rings" and insert -- ring --, therefor.

In Column 9, Line 36, in Claim 21, after "axis" insert -- and --.

In Column 10, Line 2, in Claim 21, delete "alone" and insert -- along --, therefor.

In Column 10, Line 27, in Claim 23, after "device" insert -- of --.

In Column 10, Line 38, in Claim 25, delete "member" and insert -- members --, therefor.

UNITED STATES PATENT AND TRADEMARK OFFICE
CERTIFICATE OF CORRECTION

PATENT NO. : 7,354,348 B2
APPLICATION NO. : 11/280214
DATED : April 8, 2008
INVENTOR(S) : Kapustin et al.

It is certified that error appears in the above-identified patent and that said Letters Patent is hereby corrected as shown below:

In Column 10, Line 61, in Claim 28, after "device of" insert -- the --, therefor.

Signed and Sealed this

Twenty-eighth Day of April, 2009

JOHN DOLL
*Acting Director of the United States Patent and Trademark Office*